United States Patent Office 3,354,159
Patented Nov. 21, 1967

3,354,159
PYRIMIDO-1,3,5-TRIAZINOLS
William C. Anthony, Kalamazoo, Mich., assignor to The Upjohn Company, Kalamazoo, Mich., a corporation of Delaware
No Drawing. Filed Dec. 2, 1965, Ser. No. 511,225
4 Claims. (Cl. 260—249.6)

This invention relates to novel compounds and to a process for their preparation; particularly to novel 9-allyl-2-amino-6,7,8,9-tetrahydro-4-imino - 4H - pyrimido-[1,2-a]-1,3,5-triazin-7-ol, its 9-alkyl counterparts and to a new method for producing them.

The novel compounds are represented by the formula

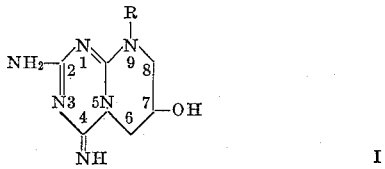

wherein R is selected from the group consisting of allyl and lower-alkyl of from 1 to 8 carbon atoms, inclusive. Examples of lower-alkyl are methyl, ethyl, propyl, butyl, pentyl, hexyl, heptyl, and octyl and the isomeric forms thereof.

The novel compounds of the invention are prepared by reacting $N^2,N^2$-diallylmelamine or an $N^2$-alkyl-$N^2$-allylmelamine of the formula

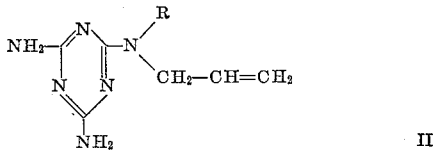

wherein R has the same meaning as above, with a trihaloperacetic acid of the formula

wherein X is selected from the group consisting of fluorine and chlorine, the fluoro derivative (trifluoroperacetic acid) being preferred. The desired trihaloperacetic acid is conveniently prepared just prior to use, e.g., by treating a cold mixture of the trihaloacetic acid and corresponding anhydride with 30% hydrogen peroxide; the cooled mixture is added to the appropriate allylmelamine (II). The reaction of the desired melamine of Formula II with the appropriate trihaloperacetic acid can advantageously be carried out at temperatures from between about 10° C. to about 125° C., preferably between about 10° C. and about 75° C. A reaction period of from about one-half to six hours is satisfactory, while about three hours is preferable. The reaction is carried out in a solvent, which must be an acid, preferably the trihaloacetic acid corresponding to the trihaloperacetic acid employed. The products (I) are recovered from the reaction mixture by conventional procedures; for example, adjustment of pH, extraction with inert solvents, recrystallization and the like.

The starting compounds of Formula II are conveniently prepared in accordance with the procedures set forth in South African Patent 5,303/62.

The novel compounds of Formula I exist in their non-protonated (free base) or protonated forms depending on the pH of their environments. They form stable protonates (acid addition salts) on neutralization with acids, for example, hydrochloric, hydrobromic, sulfuric, phosphoric, nitric, thiocyanic, fluosilicic, acetic, benzoic, salicyclic, glycolic, succinic, nicotinic, tartaric, maleic, malic, lactic, methanesulfonic, and cyclohexanesulfamic acids, and the like.

The novel compounds of Formula I depress the central nervous system; they are useful as tranquilizers in mammels and animals, e.g., mice, rats and birds.

The thiocyanic acid addition salts of the compounds of Formula I, i.e., the 9-allyl (and 9-alkyl)-2-amino-6,7,8,9-tetrahydro-4-imino - 4H - pyrimido[1,2-a]-1,3,5-triazin-7-ols, when condensed with formaldehyde, form resinous materials useful as pickling inhibitors in accordance with U.S. Patents 2,425,320 and 2,606,155. The fluosilicic acid addition salts of the compounds of Formula I are useful as mothproofing agents in accordance with U.S. Patents 1,915,334 and 2,075,359. They can also be employed as intermediates in the formation of useful resins.

EXAMPLE 1

9-allyl-2-amino-6,7,8,9-tetrahydro-4-imino-4H-pyrimido[1,2-a]-1,3,5-triazin-7-ol (I)

To an ice-cold mixture of 25 ml. of trifluoroacetic acid and 25 ml. of trifluoroacetic anhydride, 2.8 ml. of 30% hydrogen peroxide were added. The solution was cooled to 10° C. and added in portions to a stirred solution of 4 g. (0.019 mole) of $N^2,N^2$-diallylmelamine (II) and 25 ml. of trifluoroacetic acid at 6° C. The addition required 1 hour. The temperature was allowed to rise to room temperature overnight. The solution was concentrated at 30 to 35° C. and the last traces of solvent removed with a stream of nitrogen. The residue was dissolved in water and the aqueous solution was adjusted to pH 8.2 with sodium hydroxide and extracted with 2 l. of chloroform; evaporation of the chloroform yielded no organic material. The procedure was repeated at pH 9.2 but no organic material was obtained. The aqueous solution was adjusted to pH 10 with ammonium hydroxide and extracted with 1 liter of chloroform. The chloroform was evaporated to yield 95 mg. of solid. An 80-mg. fraction was dissolved in hot acetonitrile and the solution was filtered. The filtrate on cooling yielded 51 mg. of crude product (I), having a melting point of 199 to 202° C.

The aqueous solution was adjusted to pH 11.5 with ammonium hydroxide and extracted 10 times with 100-ml. portions of chloroform. The combined extracts were evaporated to yield 424 mg. of product; M.P. 190 to 194° C. Recrystallization from acetonitrile yielded 400 mg. of product; M.P. 204 to 205° C. The total yield of 9 - allyl-2-amino-6,7,8,9-tetrahydro-4-imino-4H-pyrimido-[1,2-a]-1,3,5-triazin-7-ol (I) was 11%.

Analysis.—Calcd. for $C_9H_{14}N_6O$: C, 48.63; H, 6.35; N, 37.82; O, 7.20. Found: C, 49.07; H, 6.24; N, 37.17; O, 7.73.

I.R. (mineral oil mull).—3370, 3320, 3145, 2710, 1520, 1637, 1588, 1545, 1224, 1080, 1051, 930, 775, 761 cm.$^{-1}$.

U.V.—($H_2O$) 215 m$\mu$ ($\epsilon$=37,470); 246 m$\mu$ ($\epsilon$=7,550). (0.01 N $H_2SO_4$) 215 m$\mu$ ($\epsilon$=53,520); 245 m$\mu$ ($\epsilon$=7,170). (0.01 N NaOH) 245 m$\mu$ ($\epsilon$=6,770).

EXAMPLE 2

9-allyl-2-amino-6,7,8,9-tetrahydro-4-imino-4H-pyrimido[1,2-a]-1,3,5-triazin-7-ol (I)

A solution of 11.2 ml. of 30% hydrogen peroxide was added dropwise at 6 to 10° C. to a solution of 100 ml. of trifluoroacetic acid, 112 g. of trifluoroacetic anhydride and three drops of concentrated sulfuric acid. The solution was stirred 1 hour and added dropwise to a solution of 20.4 g. (0.1 mole) of $N^2,N^2$-diallylmelamine (II) and 100 ml. of trifluoroacetic acid at 6° C. The solution was stirred at 10° C. for 1 hour, allowed to rise to 25° C. over 2 hours, heated to 50° C. over 1 hour, and gently refluxed at 72° C. for 1 hour. The solution was concentrated under reduced pressure and the residue shaken with ether and filtered. The solid was washed with ether to yield 13.0 g. of crude solid. The solid was dissolved in water and the solution was adjusted to pH 11.5 with sodium hydroxide and ammonium hydroxide. The solution was concentrated to dryness and the residue was extracted with 400 ml. of acetonitrile. The acetonitrile was concentrated to 75 ml., cooled and filtered to yield 3.7 g. of product (I); M.P. 199 to 203° C.

The above ether filtrate was concentrated to dryness. The residue was dissolved in water and the solution was adjusted to pH 8–8.5 with sodium hydroxide and then to 11.5 with ammonium hydroxide. The solution was extracted 18 times with 500-ml. portions of chloroform. The combined chloroform solution was dried over sodium sulfate and concentrated. The residue was crystallized from acetonitrile to yield 6.0 g. of product; M.P. 202 to 204° C. The total yield was 9.7 g. (43%) of 9-allyl-2-amino - 6,7,8,9 - tetrahydro - 4 - imino - 4H - pyrimido-[1,2-a]-1,3,5-triazin-7-ol (I).

Following the procedure of Examples 1 and 2, but substituting for N²,N²-diallylmelamine the following compounds:

N²-methyl-N²-allylmelamine,
N²-ethyl-N²-allylmelamine,
N²-propyl-N²-allylmelamine,
N²-isopropyl-N²-allylmelamine,
N²-butyl-N²-allylmelamine,
N²-isobutyl-N²-allylmelamine,
N²-pentyl-N²-allylmelamine,
N²-isopentyl-N²-allylmelamine,
N²-hexyl-N²-allylmelamine,
N²-isohexyl-N²-allylmelamine,
N²-heptyl-N²-allylmelamine,
N²-isoheptyl-N²-allylmelamine,
N²-octyl-N²-allylmelamine and
N²-isooctyl-N²-allylmelamine, yields, respectively, 9-methyl-2-amino-6,7,8,9-tetrahydro-4-imino-
    4H-pyrimido[1,2-a]-1,3,5-triazin-7-ol,
9-ethyl-2-amino-6,7,8,9-tetrahydro-4-imino-4H-
    pyrimido[1,2-a]-1,3,5-triazin-7-ol,
9-propyl-2-amino-6,7,8,9-tetrahydro-4-imino-4H-pyrimido[1,2-a]-1,3,5-triazin-7-ol,
9-isopropyl-2-amino-6,7,8,9-tetrahydro-4-imino-4H-pyrimido[1,2-a]-1,3,5-triazin-7-ol,
9-butyl-2-amino-6,7,8,9-tetrahydro-4-imino-4H-pyrimido[1,2-a]-1,3,5-triazin-7-ol,
9-isobutyl-2-amino-6,7,8,9-tetrahydro-4-imino-4H-pyrimido[1,2-a]-1,3,5-triazin-7-ol,
9-pentyl-2-amino-6,7,8,9-tetrahydro-4-imino-4H-pyrimido[1,2-a]-1,3,5-triazin-7-ol,
9-isopentyl-2-amino-6,7,8,9-tetrahydro-4-imino-4H-pyrimido[1,2-a]-1,3,5-triazin-7-ol,
9-hexyl-2-amino-6,7,8,9-tetrahydro-4-imino-4H-pyrimido[1,2-a]-1,3,5-triazin-7-ol,
9-isohexyl-2-amino-6,7,8,9-tetrahydro-4-imino-4H-pyrimido[1,2-a]-1,3,5-triazin-7-ol,
9-heptyl-2-amino-6,7,8,9-tetrahydro-4-imino-4H-pyrimido[1,2-a]-1,3,5-triazin-7-ol,
9-isoheptyl-2-amino-6,7,8,9-tetrahydro-4-imino-4H-pyrimido[1,2-a]-1,3,5-triazin-7-ol,
9-octyl-2-amino-6,7,8,9-tetrahydro-4-imino-4H-pyrimido[1,2-a]-1,3,5-triazin-7-ol, and
9-isooctyl-2-amino-6,7,8,9-tetrahydro-4-imino-4H-pyrimido[1,2-a]-1,3,5-triazin-7-ol.

Following the procedures of the immediately preceding paragraph and those of Examples 1 and 2, but substituting trichloroacetic acid and trichloroacetic anhydride for trifluoroacetic acid and trifluoroacetic anhydride, respectively, also yields the compounds disclosed therein.

I claim:
1. A compound selected from the group consisting of the free base form and acid addition salts of a compound of the formula

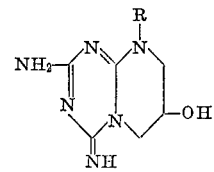

wherein R is selected from the group consisting of allyl and alkyl of 1 to 8 carbon atoms, inclusive.

2. 9-allyl - 2 - amino - 6,7,8,9-tetrahydro-4-imino-4H-pyrimido[1,2-a]-1,3,5-triazin-7-ol.

3. 9-methyl - 2 - amino - 6,7,8,9-tetrahydro-4-imino-4H-pyrimido[1,2-a]-1,3,5-triazin-7-ol.

4. A process for the production of a compound of the formula

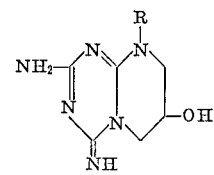

wherein R is selected from the group consisting of allyl and alkyl of 1 to 8 carbon atoms, inclusive, which comprises treating a compound of the formula

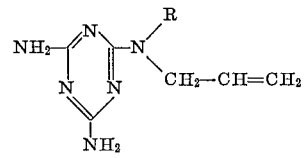

wherein R has the same meaning as above, with a compound selected from the group consisting of trifluoroperacetic acid and trichloroperacetic acid.

References Cited

UNITED STATES PATENTS 3,309,366   3/1967   Schläpfer et al. ____ 260—249.6

OTHER REFERENCES

Ziegler et al. Monatsh Chem., vol. 92, pp. 1184–90 (1961).

WALTER A. MODANCE, *Primary Examiner.*

JOHN M. FORD, *Assistant Examiner.*